United States Patent
Celinder et al.

(10) Patent No.: US 10,163,044 B2
(45) Date of Patent: Dec. 25, 2018

(54) AUTO-ADJUSTED PRINT LOCATION ON CENTER-TRACKED PRINTERS

(71) Applicant: Datamax-O'Neil Corporation, Orlando, FL (US)

(72) Inventors: Thomas Celinder, Singapore (SG); Erik Unemyr, Singapore (SG); Torben Kristofer Berggren, Singapore (SG)

(73) Assignee: Datamax-O'Neil Corporation, Orlando, FL (US)

( * ) Notice: Subject to any disclaimer, the term of this patent is extended or adjusted under 35 U.S.C. 154(b) by 0 days.

(21) Appl. No.: 15/379,563

(22) Filed: Dec. 15, 2016

(65) Prior Publication Data

US 2018/0174003 A1 Jun. 21, 2018

(51) Int. Cl.
*G06K 15/02* (2006.01)
*G06F 3/12* (2006.01)

(52) U.S. Cl.
CPC ....... *G06K 15/1805* (2013.01); *G06F 3/1204* (2013.01); *G06F 3/1208* (2013.01); *G06F 3/1254* (2013.01); *G06K 15/024* (2013.01); *G06K 15/028* (2013.01); *G06K 15/1817* (2013.01)

(58) Field of Classification Search
None
See application file for complete search history.

(56) References Cited

U.S. PATENT DOCUMENTS 4,152,083 A * 5/1979 Kostoff, II ............... B41J 29/42
400/328
5,155,499 A 10/1992 Goetz et al.
(Continued)

FOREIGN PATENT DOCUMENTS

| WO | 2013163789 A1 | 11/2013 |
|---|---|---|
| WO | 2013173985 A1 | 11/2013 |
| WO | 2014019130 A1 | 2/2014 |
| WO | 2014110495 A1 | 7/2014 |

OTHER PUBLICATIONS

U.S. Appl. No. 13/367,978, filed Feb. 7, 2012, (Feng et al.); now abandoned.

(Continued)

*Primary Examiner* — Thomas D Lee
(74) *Attorney, Agent, or Firm* — Additon, Higgins & Pendleton, P.A.

(57) ABSTRACT

The present invention embraces methods to automatically adjust print locations on a label on center-tracked printers. The methods are applicable for the initial out of the box setup and when changing media/print scripts after deployment of the printer. A novelty of the present invention is that no additional hardware may be required and the method is implemented with a relatively simple software algorithm. By utilizing a simple software algorithm and an analysis of the objects (barcode, text, shape, graphics, etc.) in the rendered image buffer, the centered position for the label can be calculated. The calculation of the centered position for the label is based on the print head width and the image width. An additional benefit with this invention is that the risk of printing outside the physical label (due to mechanical or label media roll variations) is minimized, since the image is printed centered.

20 Claims, 5 Drawing Sheets

(56) References Cited

U.S. PATENT DOCUMENTS

| | | | |
|---|---|---|---|
| 6,154,286 A | * | 11/2000 | Konno .................. G03G 15/221 |
| | | | 358/1.13 |
| 6,832,725 B2 | | 12/2004 | Gardiner et al. |
| 6,882,442 B2 | | 4/2005 | Roberts |
| 7,128,266 B2 | | 10/2006 | Marlton et al. |
| 7,159,783 B2 | | 1/2007 | Walczyk et al. |
| 7,413,127 B2 | | 8/2008 | Ehrhart et al. |
| 7,456,955 B2 | | 11/2008 | Stephens |
| 7,726,575 B2 | | 6/2010 | Wang et al. |
| 8,294,969 B2 | | 10/2012 | Plesko |
| 8,317,105 B2 | | 11/2012 | Kotlarsky et al. |
| 8,322,622 B2 | | 12/2012 | Suzhou et al. |
| 8,366,005 B2 | | 2/2013 | Kotlarsky et al. |
| 8,371,507 B2 | | 2/2013 | Haggerty et al. |
| 8,376,233 B2 | | 2/2013 | Van Horn et al. |
| 8,381,979 B2 | | 2/2013 | Franz |
| 8,390,909 B2 | | 3/2013 | Plesko |
| 8,408,464 B2 | | 4/2013 | Zhu et al. |
| 8,408,468 B2 | | 4/2013 | Horn et al. |
| 8,408,469 B2 | | 4/2013 | Good |
| 8,424,768 B2 | | 4/2013 | Rueblinger et al. |
| 8,448,863 B2 | | 5/2013 | Xian et al. |
| 8,457,013 B2 | | 6/2013 | Essinger et al. |
| 8,459,557 B2 | | 6/2013 | Havens et al. |
| 8,469,272 B2 | | 6/2013 | Kearney |
| 8,474,712 B2 | | 7/2013 | Kearney et al. |
| 8,479,992 B2 | | 7/2013 | Kotlarsky et al. |
| 8,490,877 B2 | | 7/2013 | Kearney |
| 8,517,271 B2 | | 8/2013 | Kotlarsky et al. |
| 8,523,076 B2 | | 9/2013 | Good |
| 8,528,818 B2 | | 9/2013 | Ehrhart et al. |
| 8,544,737 B2 | | 10/2013 | Gomez et al. |
| 8,548,420 B2 | | 10/2013 | Grunow et al. |
| 8,550,335 B2 | | 10/2013 | Samek et al. |
| 8,550,354 B2 | | 10/2013 | Gannon et al. |
| 8,550,357 B2 | | 10/2013 | Kearney |
| 8,556,174 B2 | | 10/2013 | Kosecki et al. |
| 8,556,176 B2 | | 10/2013 | Van Horn et al. |
| 8,556,177 B2 | | 10/2013 | Hussey et al. |
| 8,559,767 B2 | | 10/2013 | Barber et al. |
| 8,561,895 B2 | | 10/2013 | Gomez et al. |
| 8,561,903 B2 | | 10/2013 | Sauerwein |
| 8,561,905 B2 | | 10/2013 | Edmonds et al. |
| 8,565,107 B2 | | 10/2013 | Pease et al. |
| 8,571,307 B2 | | 10/2013 | Li et al. |
| 8,579,200 B2 | | 11/2013 | Samek et al. |
| 8,583,924 B2 | | 11/2013 | Caballero et al. |
| 8,584,945 B2 | | 11/2013 | Wang et al. |
| 8,587,595 B2 | | 11/2013 | Wang |
| 8,587,697 B2 | | 11/2013 | Hussey et al. |
| 8,588,869 B2 | | 11/2013 | Sauerwein et al. |
| 8,590,789 B2 | | 11/2013 | Nahill et al. |
| 8,596,539 B2 | | 12/2013 | Havens et al. |
| 8,596,542 B2 | | 12/2013 | Havens et al. |
| 8,596,543 B2 | | 12/2013 | Havens et al. |
| 8,599,271 B2 | | 12/2013 | Havens et al. |
| 8,599,957 B2 | | 12/2013 | Peake et al. |
| 8,600,158 B2 | | 12/2013 | Li et al. |
| 8,600,167 B2 | | 12/2013 | Showering |
| 8,602,309 B2 | | 12/2013 | Longacre et al. |
| 8,608,053 B2 | | 12/2013 | Meier et al. |
| 8,608,071 B2 | | 12/2013 | Liu et al. |
| 8,611,309 B2 | | 12/2013 | Wang et al. |
| 8,615,487 B2 | | 12/2013 | Gomez et al. |
| 8,621,123 B2 | | 12/2013 | Caballero |
| 8,622,303 B2 | | 1/2014 | Meier et al. |
| 8,628,013 B2 | | 1/2014 | Ding |
| 8,628,015 B2 | | 1/2014 | Wang et al. |
| 8,628,016 B2 | | 1/2014 | Winegar |
| 8,629,926 B2 | | 1/2014 | Wang |
| 8,630,491 B2 | | 1/2014 | Longacre et al. |
| 8,635,309 B2 | | 1/2014 | Berthiaume et al. |
| 8,636,200 B2 | | 1/2014 | Kearney |
| 8,636,212 B2 | | 1/2014 | Nahill et al. |
| 8,636,215 B2 | | 1/2014 | Ding et al. |
| 8,636,224 B2 | | 1/2014 | Wang |
| 8,638,806 B2 | | 1/2014 | Wang et al. |
| 8,640,958 B2 | | 2/2014 | Lu et al. |
| 8,640,960 B2 | | 2/2014 | Wang et al. |
| 8,643,717 B2 | | 2/2014 | Li et al. |
| 8,646,692 B2 | | 2/2014 | Meier et al. |
| 8,646,694 B2 | | 2/2014 | Wang et al. |
| 8,657,200 B2 | | 2/2014 | Ren et al. |
| 8,659,397 B2 | | 2/2014 | Vargo et al. |
| 8,668,149 B2 | | 3/2014 | Good |
| 8,678,285 B2 | | 3/2014 | Kearney |
| 8,678,286 B2 | | 3/2014 | Smith et al. |
| 8,682,077 B1 | | 3/2014 | Longacre |
| D702,237 S | | 4/2014 | Oberpriller et al. |
| 8,687,282 B2 | | 4/2014 | Feng et al. |
| 8,692,927 B2 | | 4/2014 | Pease et al. |
| 8,695,880 B2 | | 4/2014 | Bremer et al. |
| 8,698,949 B2 | | 4/2014 | Grunow et al. |
| 8,702,000 B2 | | 4/2014 | Barber et al. |
| 8,717,494 B2 | | 5/2014 | Gannon |
| 8,720,783 B2 | | 5/2014 | Biss et al. |
| 8,723,804 B2 | | 5/2014 | Fletcher et al. |
| 8,723,904 B2 | | 5/2014 | Marty et al. |
| 8,727,223 B2 | | 5/2014 | Wang |
| 8,740,082 B2 | | 6/2014 | Wilz |
| 8,740,085 B2 | | 6/2014 | Furlong et al. |
| 8,746,563 B2 | | 6/2014 | Hennick et al. |
| 8,750,445 B2 | | 6/2014 | Peake et al. |
| 8,752,766 B2 | | 6/2014 | Xian et al. |
| 8,756,059 B2 | | 6/2014 | Braho et al. |
| 8,757,495 B2 | | 6/2014 | Qu et al. |
| 8,760,563 B2 | | 6/2014 | Koziol et al. |
| 8,736,909 B2 | | 7/2014 | Reed et al. |
| 8,777,108 B2 | | 7/2014 | Coyle |
| 8,777,109 B2 | | 7/2014 | Oberpriller et al. |
| 8,779,898 B2 | | 7/2014 | Havens et al. |
| 8,781,520 B2 | | 7/2014 | Payne et al. |
| 8,783,573 B2 | | 7/2014 | Havens et al. |
| 8,789,757 B2 | | 7/2014 | Barten |
| 8,789,758 B2 | | 7/2014 | Hawley et al. |
| 8,789,759 B2 | | 7/2014 | Xian et al. |
| 8,794,520 B2 | | 8/2014 | Wang et al. |
| 8,794,522 B2 | | 8/2014 | Ehrhart |
| 8,794,525 B2 | | 8/2014 | Amundsen et al. |
| 8,794,526 B2 | | 8/2014 | Wang et al. |
| 8,798,367 B2 | | 8/2014 | Ellis |
| 8,807,431 B2 | | 8/2014 | Wang et al. |
| 8,807,432 B2 | | 8/2014 | Van Horn et al. |
| 8,820,630 B2 | | 9/2014 | Qu et al. |
| 8,822,848 B2 | | 9/2014 | Meagher |
| 8,824,692 B2 | | 9/2014 | Sheerin et al. |
| 8,824,696 B2 | | 9/2014 | Braho |
| 8,842,849 B2 | | 9/2014 | Wahl et al. |
| 8,844,822 B2 | | 9/2014 | Kotlarsky et al. |
| 8,844,823 B2 | | 9/2014 | Fritz et al. |
| 8,849,019 B2 | | 9/2014 | Li et al. |
| D716,285 S | | 10/2014 | Chaney et al. |
| 8,851,383 B2 | | 10/2014 | Yeakley et al. |
| 8,854,633 B2 | | 10/2014 | Laffargue |
| 8,866,963 B2 | | 10/2014 | Grunow et al. |
| 8,868,421 B2 | | 10/2014 | Braho et al. |
| 8,868,519 B2 | | 10/2014 | Maloy et al. |
| 8,868,802 B2 | | 10/2014 | Barten |
| 8,868,803 B2 | | 10/2014 | Bremer et al. |
| 8,870,074 B1 | | 10/2014 | Gannon |
| 8,879,639 B2 | | 11/2014 | Sauerwein |
| 8,880,426 B2 | | 11/2014 | Smith |
| 8,881,983 B2 | | 11/2014 | Havens et al. |
| 8,881,987 B2 | | 11/2014 | Wang |
| 8,903,172 B2 | | 12/2014 | Smith |
| 8,908,995 B2 | | 12/2014 | Benos et al. |
| 8,910,870 B2 | | 12/2014 | Li et al. |
| 8,910,875 B2 | | 12/2014 | Ren et al. |
| 8,914,290 B2 | | 12/2014 | Hendrickson et al. |
| 8,914,788 B2 | | 12/2014 | Pettinelli et al. |
| 8,915,439 B2 | | 12/2014 | Feng et al. |
| 8,915,444 B2 | | 12/2014 | Havens et al. |
| 8,916,789 B2 | | 12/2014 | Woodburn |
| 8,918,250 B2 | | 12/2014 | Hollifield |

(56) References Cited

U.S. PATENT DOCUMENTS

| | | |
|---|---|---|
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 9,224,022 B2 | 12/2015 | Ackley et al. |
| 9,224,027 B2 | 12/2015 | Van Horn et al. |
| D747,321 S | 1/2016 | London et al. |
| 9,230,140 B1 | 1/2016 | Ackley |
| 9,443,123 B2 | 1/2016 | Hejl |
| 9,250,712 B1 | 2/2016 | Todeschini |
| 9,258,033 B2 | 2/2016 | Showering |
| 9,262,633 B1 | 2/2016 | Todeschini et al. |
| 9,310,609 B2 | 4/2016 | Rueblinger et al. |
| D757,009 S | 5/2016 | Oberpriller et al. |
| 9,342,724 B2 | 5/2016 | McCloskey |
| 9,375,945 B1 | 6/2016 | Bowles |
| D760,719 S | 7/2016 | Zhou et al. |
| 9,390,596 B1 | 7/2016 | Todeschini |
| D762,604 S | 8/2016 | Fitch et al. |
| D762,647 S | 8/2016 | Fitch et al. |
| 9,412,242 B2 | 8/2016 | Van Horn et al. |
| D766,244 S | 9/2016 | Zhou et al. |
| 9,443,222 B2 | 9/2016 | Singel et al. |
| 9,478,113 B2 | 10/2016 | Xie et al. |
| 2007/0063048 A1 | 3/2007 | Havens et al. |
| 2007/0076082 A1* | 4/2007 | Cook .................... B41J 3/36 347/109 |
| 2009/0134221 A1 | 5/2009 | Zhu et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0188202 A1* | 7/2013 | Toshima .............. H04N 1/2323 358/1.5 |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Corcoran |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Li et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |

(56) References Cited

U.S. PATENT DOCUMENTS

| | | |
|---|---|---|
| 2014/0114530 A1 | 4/2014 | Fitch et al. |
| 2014/0121438 A1 | 5/2014 | Kearney |
| 2014/0121445 A1 | 5/2014 | Ding et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131441 A1 | 5/2014 | Nahill et al. |
| 2014/0131443 A1 | 5/2014 | Smith |
| 2014/0131444 A1 | 5/2014 | Wang |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Lui et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071818 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chang et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |
| 2015/0210199 A1 | 7/2015 | Payne |
| 2015/0220753 A1 | 8/2015 | Zhu et al. |
| 2015/0254485 A1 | 9/2015 | Feng et al. |
| 2015/0327012 A1 | 11/2015 | Bian et al. |
| 2016/0014251 A1 | 1/2016 | Hejl |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0109219 A1 | 4/2016 | Ackley et al. |
| 2016/0109220 A1 | 4/2016 | Laffargue |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0133253 A1 | 5/2016 | Braho et al. |
| 2016/0171720 A1 | 6/2016 | Todeschini |
| 2016/0178479 A1 | 6/2016 | Goldsmith |
| 2016/0180678 A1 | 6/2016 | Ackley et al. |
| 2016/0189087 A1 | 6/2016 | Morton et al. |
| 2016/0125873 A1 | 7/2016 | Braho et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Sewell et al. |
| 2016/0314294 A1 | 10/2016 | Kubler et al. |

OTHER PUBLICATIONS

U.S. Appl. No. 14/277,337 for Multipurpose Optical Reader, filed May 14, 2014 (Jovanovski et al.); 59 pages; now abandoned.

(56) References Cited

OTHER PUBLICATIONS

U.S. Appl. No. 14/446,391 for Multifunction Point of Sale Apparatus With Optical Signature Capture filed Jul. 30, 2014 (Good et al.); 37 pages; now abandoned.
U.S. Appl. No. 29/516,892 for Table Computer filed Feb. 6, 2015 (Bidwell et al.); 13 pages.
U.S. Appl. No. 29/523,098 for Handle for a Tablet Computer filed Apr. 7, 2015 (Bidwell et al.); 17 pages.
U.S. Appl. No. 29/528,890 for Mobile Computer Housing filed Jun. 2, 2015 (Fitch et al.); 61 pages.
U.S. Appl. No. 29/526,918 for Charging Base filed May 14, 2015 (Fitch et al.); 10 pages.
U.S. Appl. No. 14/715,916 for Evaluating Image Values filed May 19, 2015 (Ackley); 60 pages.
U.S. Appl. No. 29/525,068 for Tablet Computer With Removable Scanning Device filed Apr. 27, 2015 (Schulte et al.); 19 pages.
U.S. Appl. No. 29/468,118 for an Electronic Device Case, filed Sep. 26, 2013 (Oberpriller et al.); 44 pages.
U.S. Appl. No. 29/530,600 for Cyclone filed Jun. 18, 2015 (Vargo et al); 16 pages.
U.S. Appl. No. 14/707,123 for Application Independent DEX/UCS Interface filed May 8, 2015 (Pape); 47 pages.
U.S. Appl. No. 14/283,282 for Terminal Having Illumination and Focus Control filed May 21, 2014 (Liu et al.); 31 pages; now abandoned.
U.S. Appl. No. 14/705,407 for Method and System to Protect Software-Based Network-Connected Devices From Advanced Persistent Threat filed May 6, 2015 (Hussey et al.); 42 pages.
U.S. Appl. No. 14/704,050 for Intermediate Linear Positioning filed May 5, 2015 (Charpentier et al.); 60 pages.
U.S. Appl. No. 14/705,012 for Hands-Free Human Machine Interface Responsive to a Driver of a Vehicle filed May 6, 2015 (Fitch et al.); 44 pages.
U.S. Appl. No. 14/715,672 for Augumented Reality Enabled Hazard Display filed May 19, 2015 (Venkatesha et al.); 35 pages.
U.S. Appl. No. 14/735,717 for Indicia-Reading Systems Having an Interface With a User's Nervous System filed Jun. 10, 2015 (Todeschini); 39 pages.
U.S. Appl. No. 14/702,110 for System and Method for Regulating Barcode Data Injection Into a Running Application on a Smart Device filed May 1, 2015 (Todeschini et al.); 38 pages.
U.S. Appl. No. 14/747,197 for Optical Pattern Projector filed Jun. 23, 2015 (Thuries et al.); 33 pages.
U.S. Appl. No. 14/702,979 for Tracking Battery Conditions filed May 4, 2015 (Young et al.); 70 pages.
U.S. Appl. No. 29/529,441 for Indicia Reading Device filed Jun. 8, 2015 (Zhou et al.); 14 pages.
U.S. Appl. No. 14/747,490 for Dual-Projector Three-Dimensional Scanner filed Jun. 23, 2015 (Jovanovski et al.); 40 pages.
U.S. Appl. No. 14/740,320 for Tactile Switch for a Mobile Electronic Device filed Jun. 16, 2015 (Barndringa); 38 pages.
U.S. Appl. No. 14/740,373 for Calibrating a Volume Dimensioner filed Jun. 16, 2015 (Ackley et al.); 63 pages.

* cited by examiner

AUTO-ADJUSTED PRINT LOCATION ON CENTER-TRACKED PRINTERS

FIELD OF THE INVENTION

The present invention relates to setting up a printer, and more particularly, to the setup for printing a label on the printer for a center-tracked printer.

BACKGROUND

Generally speaking, a common scenario for printer customers is to setup a new printer and print out a first label, or when a user changes media/print scripts after initial deployment. Most of these settings may be automated and simple for the user to configure with only a button press. However, for center-tracked printers there is a need to configure the width of the media if the media is narrower than the width of the print head. The reason this need exists is due to the data being shifted from left to right on the print head, but the image should be rendered in the center of the print head. Therefore, a white margin should be inserted to center media on the label. Center-tracked printers in the market may have the same behavior when changing between different width media or during initial setup. Many users are challenged to determine what values to use in the printer setup (image width, media width, or label width without liner). These challenges may also exist when the customer changes the media.

Therefore, a need exists to automatically adjust print locations on center-tracked printers.

SUMMARY

Accordingly, in one aspect, the present invention embraces methods to automatically adjust print locations on a label on center-tracked printers. The methods may be applicable for the initial out of the box setup and when changing media/print scripts after deployment of the printer. A novelty of the present invention may be that no additional hardware is required and the method is implemented with a relatively simple software algorithm. By utilizing a simple software algorithm and an analysis of the objects (barcode, text, shape, graphics, etc.) in the rendered image buffer, the centered position for the label can be calculated. The calculation of the centered position for the label may be based on the print head width and the image width.

In an exemplary embodiment, a method of automatically configuring a print location on a center-tracked printer may comprise parsing print commands of incoming data comprising an image; rendering an image buffer; determining location of leftmost black pixel of the image; determining location of rightmost black pixel of the image; determining an image width, wherein, the image width equals the location of rightmost black pixel minus the location of leftmost black pixel. In other words, the image width equals the distance between the rightmost black pixel and the leftmost black pixel; calculating a left margin by subtracting the image width from a width of the print head and dividing the difference by two; adding the left margin to the image width to determine a centered image position on a label; and sending the image and centered image position on the label to the print head.

If the image is not to be centered on the label, manually adjusting the left margin to determine the print location. The manual adjustment comprises modifying printer width settings to a specific value. The print head may be a thermal print head. The center-track printer may comprise a desktop clam shell printer or a mobile printer. Further, the method may be implemented for an out of box setup, or when changing media/print scripts after deployment.

In another exemplary embodiment, a method may be implemented on a printer and may comprise parsing incoming data of an image and rendering an image buffer; determining a left edge and a right edge of the image inside the image buffer; calculating image width; calculating a white space to be added to left of the image; and printing the image centered on a label. The method may automatically configure the print location on a center-tracked printer.

The determination of the left edge of the image inside the image buffer may comprise determining location of leftmost black pixel of the image. The determination of the right edge of the image inside the image buffer may comprise determining location of rightmost black pixel of the image. The image width equals the distance between a location of the rightmost black pixel and the location of the leftmost black pixel. The calculation of the white space to be added to left of the image may comprise determining a left margin, where a left margin (or white space) equals half of the difference between a width of a print head and the image width. A centered image position on the label may be determined by adding a value of the left margin to the image. The center-tracked printer may comprise a thermal print head.

In yet another exemplary embodiment, a method implemented on a printer may comprise parsing incoming data of an image and rendering an image buffer; determining left edge and right edge of the image inside the image buffer; and calculating image width. If the image is to be centered on a label: calculating a white space to be added to left of the image, and printing the image centered on the label. If the image is not to be centered on the label: manually adjusting the white space for a non-symmetrical label; and printing the image on the non-symmetrical label. The method may comprise automatically configuring the print location on a center-tracked printer.

The method may further comprise, utilizing an existing configuration setting, such as a "Media Margin" setting, to manually shift the image left or right in order to determine a print location on the label, such as a print location to center the image on the label. The method may further comprise manually modifying printer width settings to a specific value in order to center the image on the label. These manual methods are optional.

The determination of left edge and right edge of the image inside the image buffer may comprise determining location of leftmost black pixel of the image, and determining location of rightmost black pixel of the image. The image width equals the distance between the location of the rightmost black pixel and the location of the leftmost black pixel. The determination of the centered image position may comprise: calculating the white space by subtracting the image width from a width of the print head and dividing the difference by two; and adding the white space to a left side of the image width to determine the centered image position on the label. The image and centered image position on the label may be sent to the print head.

The foregoing illustrative summary, as well as other exemplary objectives and/or advantages of the invention, and the manner in which the same are accomplished, are further explained within the following detailed description and its accompanying drawings.

DETAILED DESCRIPTION

Figure 1:
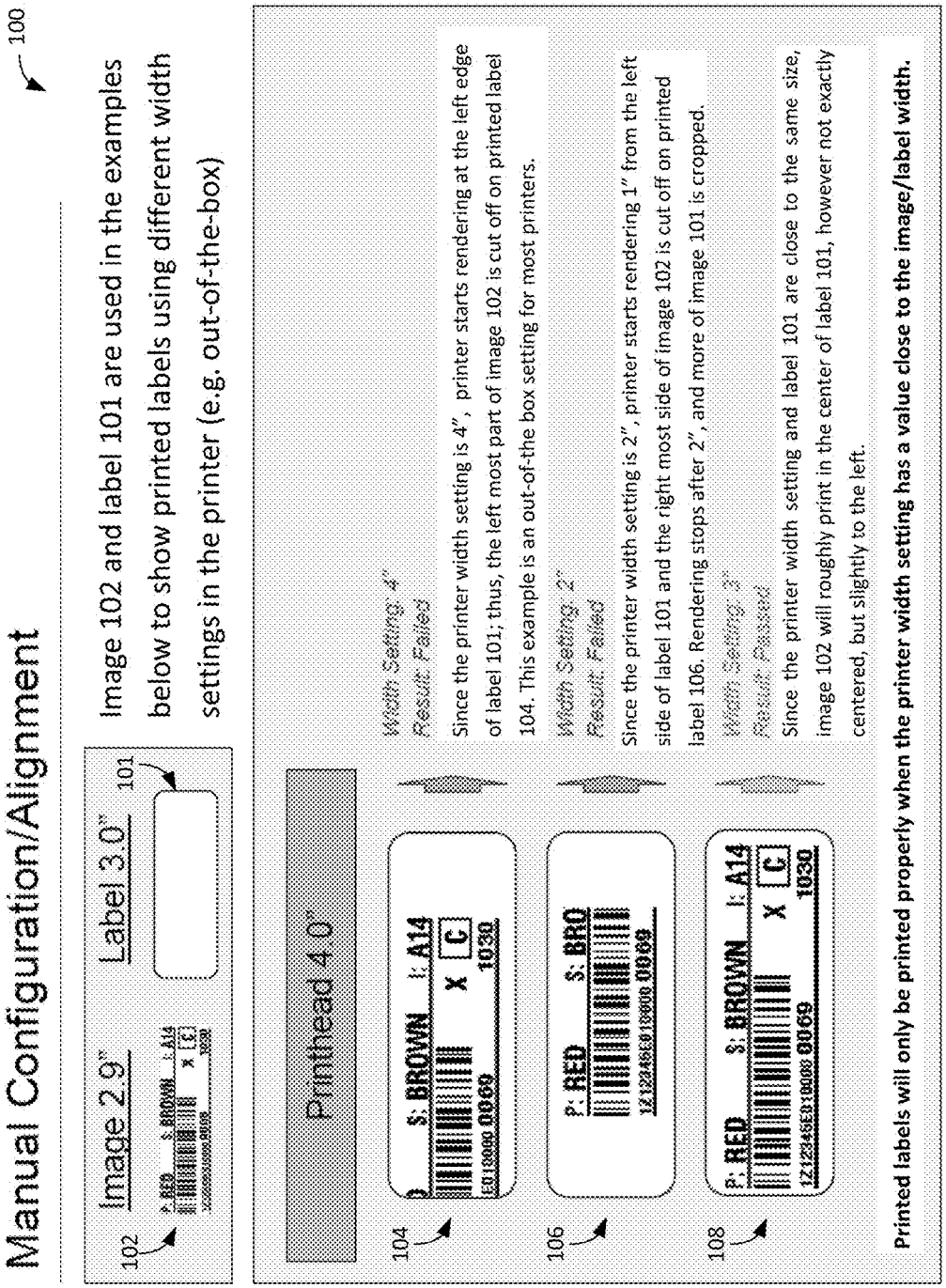
FIG. 1 illustrates an embodiment of manual configuration and alignment with the printer label using different width settings in the printer.

The present invention embraces methods to automatically adjust printer locations on a label on center-tracked printers. The methods are applicable for the initial out of the box setup and when changing media/print scripts after deployment of the printer.

There are other solutions which use sensors and other hardware to detect the width automatically, but these solutions may require additional hardware that may lack accuracy, especially for small labels. A novel element of the present invention is that no additional hardware is specified and the method is implemented with a relatively simple software algorithm. The benefits may include removing configuration steps from the user, removing a requirement for additional hardware and reliably ensuring that the label is accurately centered on the label. By utilizing a simple software algorithm and an analysis of the objects (barcode, text, shape, graphics, etc.) in the rendered image buffer, the centered position for the label can be calculated.

The present invention analyzes the rendered image buffer to determine the horizontal positions of the leftmost and rightmost pixels, and from those values the width of the image to be printed is calculated. Then the image width is subtracted from the print head width and the difference is divided by 2 to determine the amount of white space to add in on the left side of the image. As a final step, the white space is added before shifting out the image to the print head. This step ensures the position of the rendered image is in the center of the print head.

An additional benefit with this invention is that the risk of printing outside the physical label (due to mechanical or label media roll variations) is minimized, since the image is printed centered. When manually configured, the image may be close to the edge of the label and occasionally be printed outside the label, but with the present invention the risk of this event is dramatically reduced.

The existing printer media width settings, currently ranging from one (1) up to the print head width, could be extended with an additional option—AUTO—used to enable the automatic centering feature described in the present invention. The default setting can be AUTO on center-tracked (mobile) printer products.

To provide flexibility for customers in need of tweaking the horizontal position, there are two methods that may be considered. First, the existing "Media Margin" configuration setting may be used, to manually shift the image to the left or the right. The media margin method includes an X offset or X margin which shifts the entire image to the left or right, hence manually shifting the image. Second, another option to override the automatic settings can be to allow the user to modify the width to a specific value that alternatively can be used. The reason for providing a manual override is to support some customers who print labels that may not be centered, e.g. due to pre-printed objects of one side of the label or non-symmetrical label. These customers can continue to manually configure the media width.

The aforementioned two methods are achieving the same objective but using two different settings. The methods manually shift the image by modifying offset values or other media related settings.

Typically, printers are not marketed as center-tracked, per se; "center-tracked" is simply a feature of printer construction. Most desktop clam shell printers and mobile printers are center-tracked and they are defined by having the media dropped in the media holder which is automatically centering the roll. This construction is different from a typical barcode printer which has a spine where the media is pushed to the left and against the spine. For these left track printers, the printout may start from the left part of the print head.

FIG. 1 illustrates embodiment 100 of manual configuration and alignment with a printer label using different width settings in the printer. Image 102 and label 101 may be used in the examples in embodiment 100 to show printed labels using different width settings in the printer (e.g. out-of-the-box). In embodiment 100, the width of image 102 is 2.9 inches, and the width of the print head is 4.0 inches. When using a printer width setting, or width setting, of 4.0 inches, printed label 104 illustrates that that image 102 is not properly printed on label 101 (Failed). Since the width setting is 4.0 inches, the printer may start rendering at the left edge of label 101 and hence the leftmost part of image 102 is cut off on printed label 104. This example is also an out-of-the box setting for most printers.

As previously noted, in embodiment 100, the width of image 102 is 2.9 inches, the width of label 101 is 3.0 inches and the width of the print head is 4.0 inches. When using a printer width setting of 2.0 inches, printed label 106 illustrates that image 102 is not properly printed on label 101 (Failed). Since the printer width setting is 2.0 inches, the printer may start rendering 1.0 inch from the left side of label 101 and the rightmost side of image 102 may be cut off on printed label 106. The rendering may stop after 2.0 inches, and more of image 102 may be cropped.

As previously noted, in embodiment 100, the width of image 102 is 2.9 inches, the width of label 101 is 3.0 inches, and the width of the print head is 4.0 inches. When using a width setting in the printer of 3.0 inches, printed label 108 illustrates that image 102 is properly printed (Passed). Since the printer width setting and width of label 101 are essentially the same size, image 102 may roughly print in the center of the printed label 108. Image 102 is not exactly centered on printed label 108, but slightly to the left. With embodiment 100, the printed labels may only be printed properly when the printer width setting has a value essentially the same as the image/label width.

Figure 2:
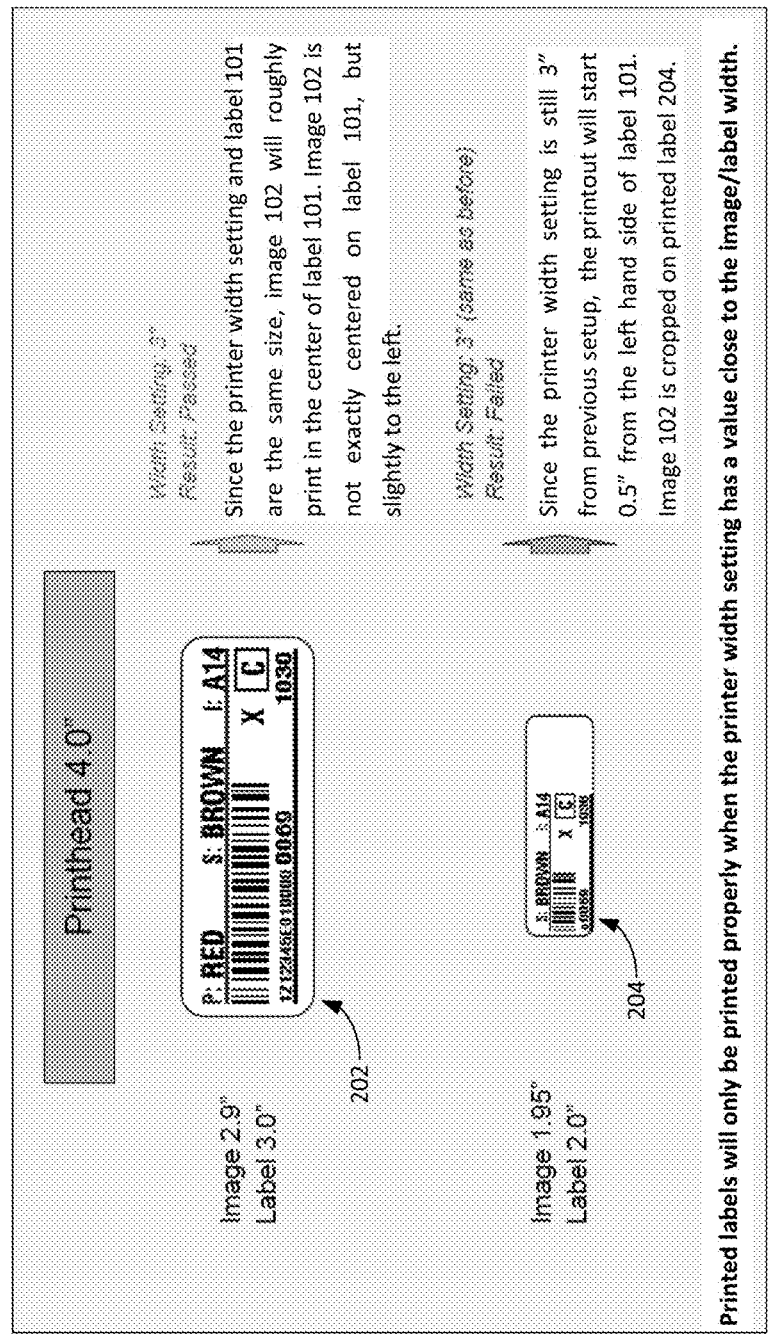
FIG. 2 illustrates an embodiment of manual configuration and alignment with a smaller printer label than the out of the box setting.

FIG. 2 illustrates in embodiment 200 a manual configuration and alignment with a smaller printer label than the out of the box setting. Embodiment 200 shows how image 102 may be centered after a user manually configures the system out of the box. When changing to a smaller label and the print out of image 102 may be cropped.

In embodiment 200, the width of printed label 202 is 2.9 inches, the width of label 101 is 3.0 inches, and the width of the print head is 4.0 inches. With a printer width setting of 3.0 inches, printed label 202 illustrates that image 102 is properly printed (Passed). Since the printer width setting and label 101 are essentially the same size, image 102 may roughly print in the center of label 101. Image 102 may not be exactly centered on label 101, but slightly to the left.

In embodiment 200, the width of printed label 204 is 1.95 inches, the width of label 101 is 2.0 inches, and the width of print head is 4.0 inches. For this example, with a printer width setting of 3.0 inches (same as above), printed label 204 illustrates that image 102 is not properly printed (Failed). Since the printer width setting is still 3 inches from previous setup, the printout may start 0.50 inches from the left hand side of label 101. Hence, image 102 may be cropped on printed label 204. With embodiment 200, the printed labels may only be printed properly when the printer width setting is essentially the same as the image/label width.

Figure 3:
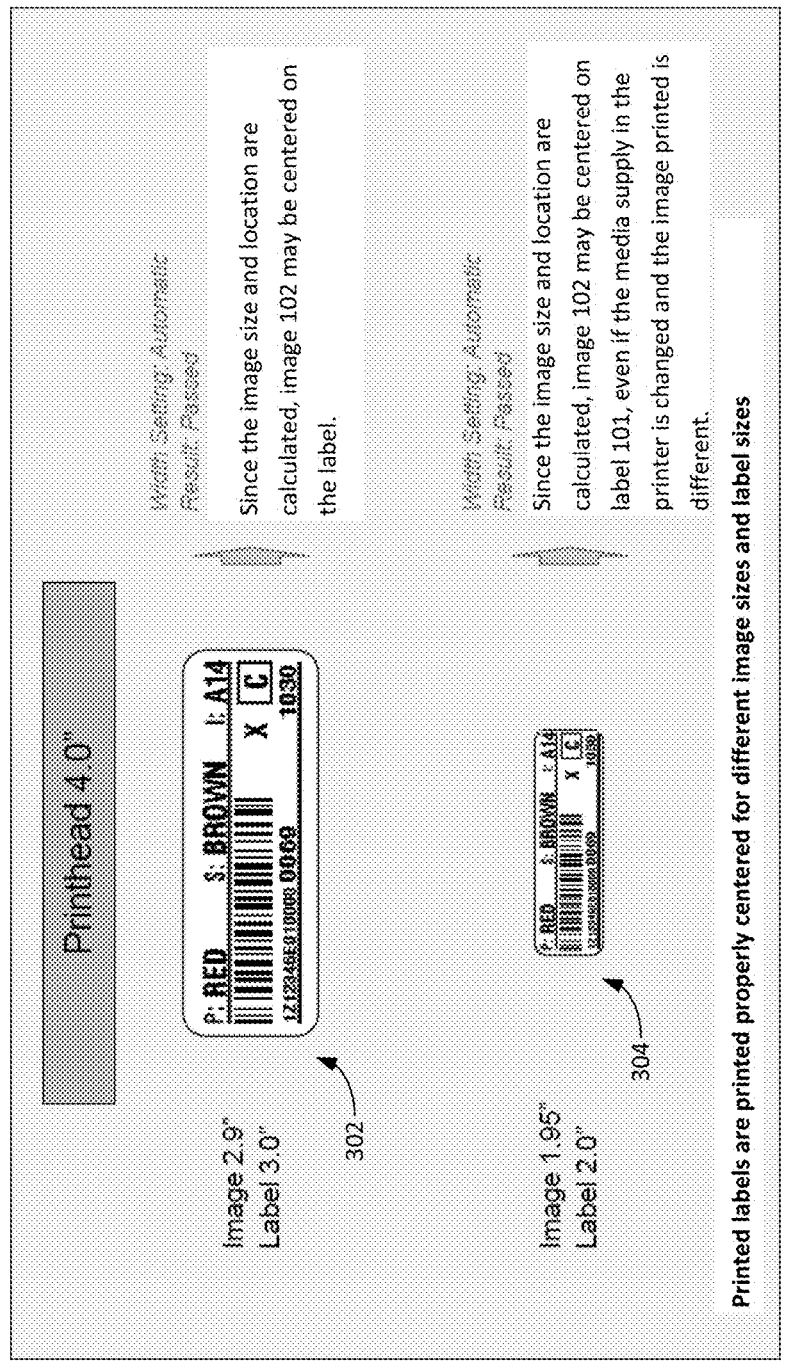
FIG. 3 illustrates an exemplary embodiment of an automatic configuration and alignment of a printer for the printing of labels.

FIG. 3 illustrates an exemplary embodiment 300 of an automatic configuration and alignment of a printer for the printing of labels. Embodiment 300 shows how the image is centered on label 101. Embodiment 300 applies for out of the box applications and when a user is changing from one label size to another.

In embodiment 300, the width of printed label 302 is 2.9 inches, the width of label 101 is 3.0 inches, and the width of print head is 4.0 inches. With an automatic printer width setting, printed label 302 illustrates that image 102 is properly printed (Passed). Since the image size and location are calculated, image 102 may be centered on the label.

In embodiment 300, the width of printed label 304 is 1.95 inches, the width of label 101 is 2.0 inches, and the width of the print head is 4.0 inches. With an automatic printer width setting, printed label 304 illustrates that image 102 is properly printed (Passed). Since the image size and location are calculated, image 102 may be centered on label 101, even if the media supply in the printer is changed and the image printed is different. For example, 1) if the media is changed to a wider/less wide media, the image may be still printed in the center of the new media, or 2) if the image printed is wider or less wide, but label remains the same, the image may be still printed centered. With embodiment 300, the labels may be properly centered each time in the printed labels.

Figure 4:
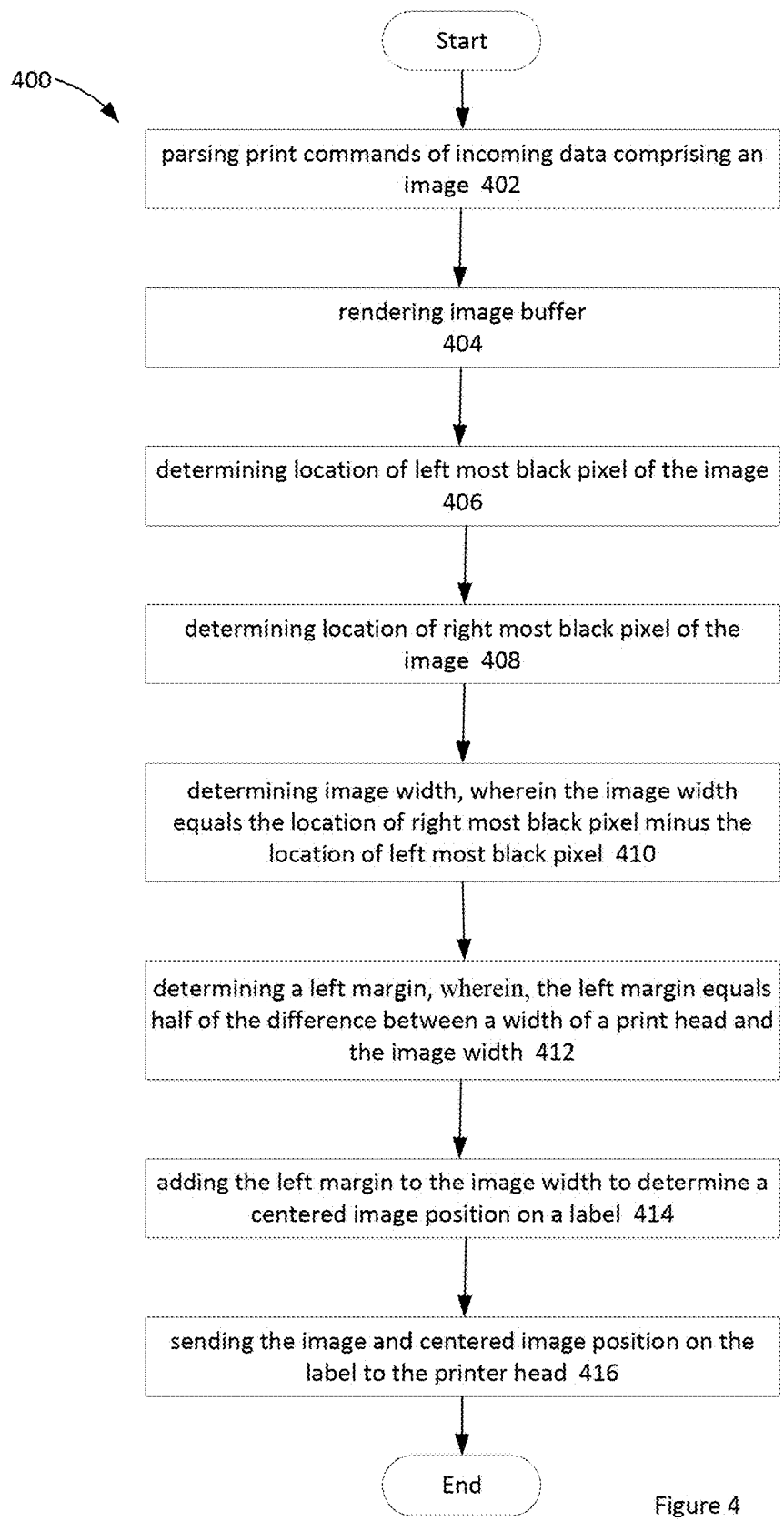
FIG. 4 illustrates an exemplary embodiment of a flow chart for a method to automatically adjust print location on a center-tracked printer.

FIG. 4 illustrates an exemplary embodiment 400 of a flow chart for a method to automatically adjust print location on a center-tracked printer. The method comprises the following steps.

Parsing print commands of incoming data comprising an image (step 402);
Rendering an image buffer (step 404);
Determining location of a leftmost black pixel of the image (step 406);
Determining location of a rightmost black pixel of the image (step 408);
Determining an image width, wherein the image width equals a location of rightmost black pixel minus a location of leftmost black pixel. In other words, the image width equals the distance between the rightmost black pixel and the leftmost black pixel (step 410);
Determining a left margin, wherein, the left margin equals half of the difference between a width of a print head and the image width (step 412);
Adding the left margin to the image width to determine a centered image position on a label (step 414); and
Sending the image and centered image position on the label to the print head (step 416).

Figure 5:
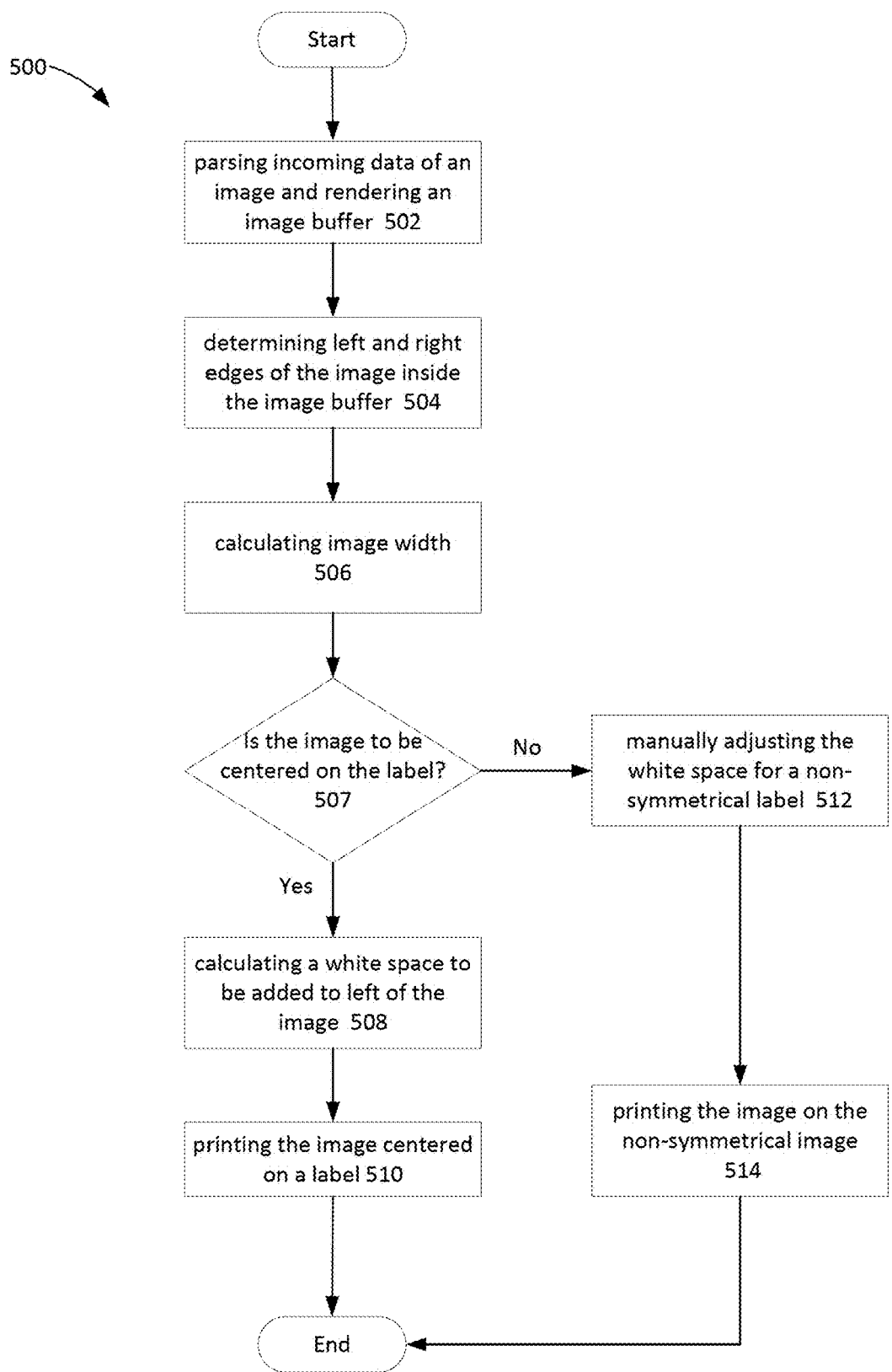
FIG. 5 illustrates another exemplary embodiment of a flow chart for a method to automatically adjust print location on a center-tracked printer.

FIG. 5 illustrates another exemplary embodiment 500 of a flow chart for a method to automatically adjust print location on a center-tracked printer. The method comprises the following steps.

Parsing incoming data of an image and rendering an image buffer (step 502);
Determining left and right edges of the image inside the image buffer (step 504);
Calculating image width (step 506);
If the image is to be centered on the label (step 507):
Calculating a white space to be added to left of the image (step 508); and
Printing the image centered on a label (step 510);
If the image is not to be centered on the label (step 507):
Manually adjusting the white space for a non-symmetrical label (step 512); and
Printing the image on the non-symmetrical image on a label (step 514).

To supplement the present disclosure, this application incorporates entirely by reference the following commonly assigned patents, patent application publications, and patent applications:

U.S. Pat. No. 6,832,725; U.S. Pat. No. 7,128,266;
U.S. Pat. No. 7,159,783; U.S. Pat. No. 7,413,127;
U.S. Pat. No. 7,726,575; U.S. Pat. No. 8,294,969;
U.S. Pat. No. 8,317,105; U.S. Pat. No. 8,322,622;
U.S. Pat. No. 8,366,005; U.S. Pat. No. 8,371,507;
U.S. Pat. No. 8,376,233; U.S. Pat. No. 8,381,979;
U.S. Pat. No. 8,390,909; U.S. Pat. No. 8,408,464;
U.S. Pat. No. 8,408,468; U.S. Pat. No. 8,408,469;
U.S. Pat. No. 8,424,768; U.S. Pat. No. 8,448,863;
U.S. Pat. No. 8,457,013; U.S. Pat. No. 8,459,557;
U.S. Pat. No. 8,469,272; U.S. Pat. No. 8,474,712;
U.S. Pat. No. 8,479,992; U.S. Pat. No. 8,490,877;
U.S. Pat. No. 8,517,271; U.S. Pat. No. 8,523,076;
U.S. Pat. No. 8,528,818; U.S. Pat. No. 8,544,737;
U.S. Pat. No. 8,548,242; U.S. Pat. No. 8,548,420;
U.S. Pat. No. 8,550,335; U.S. Pat. No. 8,550,354;
U.S. Pat. No. 8,550,357; U.S. Pat. No. 8,556,174;
U.S. Pat. No. 8,556,176; U.S. Pat. No. 8,556,177;
U.S. Pat. No. 8,559,767; U.S. Pat. No. 8,599,957;
U.S. Pat. No. 8,561,895; U.S. Pat. No. 8,561,903;
U.S. Pat. No. 8,561,905; U.S. Pat. No. 8,565,107;
U.S. Pat. No. 8,571,307; U.S. Pat. No. 8,579,200;
U.S. Pat. No. 8,583,924; U.S. Pat. No. 8,584,945;
U.S. Pat. No. 8,587,595; U.S. Pat. No. 8,587,697;
U.S. Pat. No. 8,588,869; U.S. Pat. No. 8,590,789;
U.S. Pat. No. 8,596,539; U.S. Pat. No. 8,596,542;
U.S. Pat. No. 8,596,543; U.S. Pat. No. 8,599,271;
U.S. Pat. No. 8,599,957; U.S. Pat. No. 8,600,158;
U.S. Pat. No. 8,600,167; U.S. Pat. No. 8,602,309;
U.S. Pat. No. 8,608,053; U.S. Pat. No. 8,608,071;
U.S. Pat. No. 8,611,309; U.S. Pat. No. 8,615,487;
U.S. Pat. No. 8,616,454; U.S. Pat. No. 8,621,123;
U.S. Pat. No. 8,622,303; U.S. Pat. No. 8,628,013;
U.S. Pat. No. 8,628,015; U.S. Pat. No. 8,628,016;
U.S. Pat. No. 8,629,926; U.S. Pat. No. 8,630,491;
U.S. Pat. No. 8,635,309; U.S. Pat. No. 8,636,200;
U.S. Pat. No. 8,636,212; U.S. Pat. No. 8,636,215;
U.S. Pat. No. 8,636,224; U.S. Pat. No. 8,638,806;
U.S. Pat. No. 8,640,958; U.S. Pat. No. 8,640,960;
U.S. Pat. No. 8,643,717; U.S. Pat. No. 8,646,692;
U.S. Pat. No. 8,646,694; U.S. Pat. No. 8,657,200;
U.S. Pat. No. 8,659,397; U.S. Pat. No. 8,668,149;
U.S. Pat. No. 8,678,285; U.S. Pat. No. 8,678,286;
U.S. Pat. No. 8,682,077; U.S. Pat. No. 8,687,282;
U.S. Pat. No. 8,692,927; U.S. Pat. No. 8,695,880;
U.S. Pat. No. 8,698,949; U.S. Pat. No. 8,717,494;
U.S. Pat. No. 8,717,494; U.S. Pat. No. 8,720,783;
U.S. Pat. No. 8,723,804; U.S. Pat. No. 8,723,904;
U.S. Pat. No. 8,727,223; U.S. Pat. No. D702,237;
U.S. Pat. No. 8,740,082; U.S. Pat. No. 8,740,085;
U.S. Pat. No. 8,746,563; U.S. Pat. No. 8,750,445;

U.S. Pat. No. 8,752,766; U.S. Pat. No. 8,756,059;
U.S. Pat. No. 8,757,495; U.S. Pat. No. 8,760,563;
U.S. Pat. No. 8,763,909; U.S. Pat. No. 8,777,108;
U.S. Pat. No. 8,777,109; U.S. Pat. No. 8,779,898;
U.S. Pat. No. 8,781,520; U.S. Pat. No. 8,783,573;
U.S. Pat. No. 8,789,757; U.S. Pat. No. 8,789,758;
U.S. Pat. No. 8,789,759; U.S. Pat. No. 8,794,520;
U.S. Pat. No. 8,794,522; U.S. Pat. No. 8,794,525;
U.S. Pat. No. 8,794,526; U.S. Pat. No. 8,798,367;
U.S. Pat. No. 8,807,431; U.S. Pat. No. 8,807,432;
U.S. Pat. No. 8,820,630; U.S. Pat. No. 8,822,848;
U.S. Pat. No. 8,824,692; U.S. Pat. No. 8,824,696;
U.S. Pat. No. 8,842,849; U.S. Pat. No. 8,844,822;
U.S. Pat. No. 8,844,823; U.S. Pat. No. 8,849,019;
U.S. Pat. No. 8,851,383; U.S. Pat. No. 8,854,633;
U.S. Pat. No. 8,866,963; U.S. Pat. No. 8,868,421;
U.S. Pat. No. 8,868,519; U.S. Pat. No. 8,868,802;
U.S. Pat. No. 8,868,803; U.S. Pat. No. 8,870,074;
U.S. Pat. No. 8,879,639; U.S. Pat. No. 8,880,426;
U.S. Pat. No. 8,881,983; U.S. Pat. No. 8,881,987;
U.S. Pat. No. 8,903,172; U.S. Pat. No. 8,908,995;
U.S. Pat. No. 8,910,870; U.S. Pat. No. 8,910,875;
U.S. Pat. No. 8,914,290; U.S. Pat. No. 8,914,788;
U.S. Pat. No. 8,915,439; U.S. Pat. No. 8,915,444;
U.S. Pat. No. 8,916,789; U.S. Pat. No. 8,918,250;
U.S. Pat. No. 8,918,564; U.S. Pat. No. 8,925,818;
U.S. Pat. No. 8,939,374; U.S. Pat. No. 8,942,480;
U.S. Pat. No. 8,944,313; U.S. Pat. No. 8,944,327;
U.S. Pat. No. 8,944,332; U.S. Pat. No. 8,950,678;
U.S. Pat. No. 8,967,468; U.S. Pat. No. 8,971,346;
U.S. Pat. No. 8,976,030; U.S. Pat. No. 8,976,368;
U.S. Pat. No. 8,978,981; U.S. Pat. No. 8,978,983;
U.S. Pat. No. 8,978,984; U.S. Pat. No. 8,985,456;
U.S. Pat. No. 8,985,457; U.S. Pat. No. 8,985,459;
U.S. Pat. No. 8,985,461; U.S. Pat. No. 8,988,578;
U.S. Pat. No. 8,988,590; U.S. Pat. No. 8,991,704;
U.S. Pat. No. 8,996,194; U.S. Pat. No. 8,996,384;
U.S. Pat. No. 9,002,641; U.S. Pat. No. 9,007,368;
U.S. Pat. No. 9,010,641; U.S. Pat. No. 9,015,513;
U.S. Pat. No. 9,016,576; U.S. Pat. No. 9,022,288;
U.S. Pat. No. 9,030,964; U.S. Pat. No. 9,033,240;
U.S. Pat. No. 9,033,242; U.S. Pat. No. 9,036,054;
U.S. Pat. No. 9,037,344; U.S. Pat. No. 9,038,911;
U.S. Pat. No. 9,038,915; U.S. Pat. No. 9,047,098;
U.S. Pat. No. 9,047,359; U.S. Pat. No. 9,047,420;
U.S. Pat. No. 9,047,525; U.S. Pat. No. 9,047,531;
U.S. Pat. No. 9,053,055; U.S. Pat. No. 9,053,378;
U.S. Pat. No. 9,053,380; U.S. Pat. No. 9,058,526;
U.S. Pat. No. 9,064,165; U.S. Pat. No. 9,064,167;
U.S. Pat. No. 9,064,168; U.S. Pat. No. 9,064,254;
U.S. Pat. No. 9,066,032; U.S. Pat. No. 9,070,032;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902;
U.S. Design Pat. No. D733,112;
U.S. Design Pat. No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;

U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);
U.S. patent application Ser. No. 14/150,393 for Indicia-reader Having Unitary Construction Scanner, filed Jan. 8, 2014 (Colavito et al.);
U.S. patent application Ser. No. 14/200,405 for Indicia Reader for Size-Limited Applications filed Mar. 7, 2014 (Feng et al.);

U.S. patent application Ser. No. 14/231,898 for Hand-Mounted Indicia-Reading Device with Finger Motion Triggering filed Apr. 1, 2014 (Van Horn et al.);

U.S. patent application Ser. No. 29/486,759 for an Imaging Terminal, filed Apr. 2, 2014 (Oberpriller et al.);

U.S. patent application Ser. No. 14/257,364 for Docking System and Method Using Near Field Communication filed Apr. 21, 2014 (Showering);

U.S. patent application Ser. No. 14/264,173 for Autofocus Lens System for Indicia Readers filed Apr. 29, 2014 (Ackley et al.);

U.S. patent application Ser. No. 14/277,337 for MULTIPURPOSE OPTICAL READER, filed May 14, 2014 (Jovanovski et al.);

U.S. patent application Ser. No. 14/283,282 for TERMINAL HAVING ILLUMINATION AND FOCUS CONTROL filed May 21, 2014 (Liu et al.);

U.S. patent application Ser. No. 14/327,827 for a MOBILE-PHONE ADAPTER FOR ELECTRONIC TRANSACTIONS, filed Jul. 10, 2014 (Hejl);

U.S. patent application Ser. No. 14/334,934 for a SYSTEM AND METHOD FOR INDICIA VERIFICATION, filed Jul. 18, 2014 (Hejl);

U.S. patent application Ser. No. 14/339,708 for LASER SCANNING CODE SYMBOL READING SYSTEM, filed Jul. 24, 2014 (Xian et al.);

U.S. patent application Ser. No. 14/340,627 for an AXIALLY REINFORCED FLEXIBLE SCAN ELEMENT, filed Jul. 25, 2014 (Rueblinger et al.);

U.S. patent application Ser. No. 14/446,391 for MULTIFUNCTION POINT OF SALE APPARATUS WITH OPTICAL SIGNATURE CAPTURE filed Jul. 30, 2014 (Good et al.);

U.S. patent application Ser. No. 14/452,697 for INTERACTIVE INDICIA READER, filed Aug. 6, 2014 (Todeschini);

U.S. patent application Ser. No. 14/453,019 for DIMENSIONING SYSTEM WITH GUIDED ALIGNMENT, filed Aug. 6, 2014 (Li et al.);

U.S. patent application Ser. No. 14/462,801 for MOBILE COMPUTING DEVICE WITH DATA COGNITION SOFTWARE, filed on Aug. 19, 2014 (Todeschini et al.);

U.S. patent application Ser. No. 14/483,056 for VARIABLE DEPTH OF FIELD BARCODE SCANNER filed Sep. 10, 2014 (McCloskey et al.);

U.S. patent application Ser. No. 14/513,808 for IDENTIFYING INVENTORY ITEMS IN A STORAGE FACILITY filed Oct. 14, 2014 (Singel et al.);

U.S. patent application Ser. No. 14/519,195 for HANDHELD DIMENSIONING SYSTEM WITH FEEDBACK filed Oct. 21, 2014 (Laffargue et al.);

U.S. patent application Ser. No. 14/519,179 for DIMENSIONING SYSTEM WITH MULTIPATH INTERFERENCE MITIGATION filed Oct. 21, 2014 (Thuries et al.);

U.S. patent application Ser. No. 14/519,211 for SYSTEM AND METHOD FOR DIMENSIONING filed Oct. 21, 2014 (Ackley et al.);

U.S. patent application Ser. No. 14/519,233 for HANDHELD DIMENSIONER WITH DATA-QUALITY INDICATION filed Oct. 21, 2014 (Laffargue et al.);

U.S. patent application Ser. No. 14/519,249 for HANDHELD DIMENSIONING SYSTEM WITH MEASUREMENT-CONFORMANCE FEEDBACK filed Oct. 21, 2014 (Ackley et al.);

U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);

U.S. patent application Ser. No. 14/529,563 for ADAPTABLE INTERFACE FOR A MOBILE COMPUTING DEVICE filed Oct. 31, 2014 (Schoon et al.);

U.S. patent application Ser. No. 14/529,857 for BARCODE READER WITH SECURITY FEATURES filed Oct. 31, 2014 (Todeschini et al.);

U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);

U.S. patent application Ser. No. 14/531,154 for DIRECTING AN INSPECTOR THROUGH AN INSPECTION filed Nov. 3, 2014 (Miller et al.);

U.S. patent application Ser. No. 14/533,319 for BARCODE SCANNING SYSTEM USING WEARABLE DEVICE WITH EMBEDDED CAMERA filed Nov. 5, 2014 (Todeschini);

U.S. patent application Ser. No. 14/535,764 for CONCATENATED EXPECTED RESPONSES FOR SPEECH RECOGNITION filed Nov. 7, 2014 (Braho et al.);

U.S. patent application Ser. No. 14/568,305 for AUTO-CONTRAST VIEWFINDER FOR AN INDICIA READER filed Dec. 12, 2014 (Todeschini);

U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A method of automatically configuring a print location on a center-tracked printer, comprising:

parsing, via the printer, print commands of incoming data comprising an image;

rendering, via the printer, an image buffer;

determining, via the printer, a location of leftmost black pixel of the image;

determining, via the printer, a location of rightmost black pixel of the image;

determining, via the printer, an image width, wherein the image width equals a distance between the rightmost black pixel and the leftmost black pixel;

in response to determining the image width, calculating, via the printer, a left margin by subtracting the image width from a width of a print head of the printer and dividing difference by two;

in response to calculating the left margin, adding, via the printer, the left margin to the image width to determine a centered image position for printing on a label;

sending, via the printer, the image and the centered image position to the print head for printing on the label; and printing, via the print head and based upon the centered image position, the image centered on the label, wherein the printing is performed without the printer detecting or otherwise receiving input regarding the width of the label.

2. The method according to claim 1 wherein, the print head comprises a thermal print head.

3. The method according to claim 1, wherein, the center-track printer comprises a desktop clam shell printer or a mobile printer.

4. The method according to claim 1, wherein, if the image is not to be centered on the label, manually adjusting the left margin to determine the print location.

5. The method according to claim 4, wherein, the manual adjustment comprises modifying printer width settings to a specific value.

6. A method implemented on a printer comprising a print head, comprising:

parsing, via the printer, incoming data of an image and rendering an image buffer;

determining, via the printer, a left edge and a right edge of the image inside the image buffer;

calculating, via the printer, an image width of the image;

in response to calculating the image width, calculating, via the printer, a white space to be added to left of the image during printing using the image width and the width of the print head; and printing, via the print head and based upon the calculated white space, the image centered on a label having the white space added to the left of the image;

wherein the printing of the image centered on the label is performed without the printer detecting or otherwise receiving input regarding the width of the label.

7. The method according to claim 6, wherein, the determination of the left edge of the image inside the image buffer comprises determining a location of leftmost black pixel of the image.

8. The method according to claim 6, wherein, the determination of the right edge of the image inside the image buffer comprises determining a location of rightmost black pixel of the image.

9. The method according to claim 6, wherein, the image width equals a distance between a location of rightmost black pixel and a location of leftmost black pixel.

10. The method according to claim 6, wherein, the white space equals half of a difference between the width of the print head and the image width.

11. The method according to claim 10, wherein, a centered image position on the label is determined by adding a value of the white space to the image width.

12. The method according to claim 6 wherein, the printer comprises a thermal print head.

13. A method implemented on a center-tracked printer, comprising:
- parsing, via the printer, incoming data of an image and rendering an image buffer;
- determining, via the printer, a left edge and a right edge of the image inside the image buffer;
- calculating, via the printer, image width; and
- if the image is to be centered on a label:
  - calculating, via the printer, a white space to be added to left of the image during printing based upon the image width and the width of a print head of the printer to determine a centered image position, and
  - printing, via the print head, the image centered on the label based upon the centered image position, wherein the printing of the image centered on the label is performed without the printer detecting or otherwise receiving input regarding the width of the label.

14. The method according to claim 13, comprising:
if the image is not to be centered on the label:
manually adjusting on the center-tracked printer the white space for a non-symmetrical label; and
printing the image on the non-symmetrical label.

15. The method according to claim 14, comprising, utilizing an existing configuration setting to manually shift the image left or right in order to determine a print location on the label.

16. The method according to claim 14, further comprising, manually modifying printer width settings to a specific value in order to center the image on the label.

17. The method according to claim 13, wherein, the determination of the left edge and the right edge of the image inside the image buffer comprises determining a location of leftmost black pixel of the image, and determining a location of rightmost black pixel of the image.

18. The method according to claim 17, wherein, the image width equals a distance between the location of the rightmost black pixel and the location of the leftmost black pixel.

19. The method according to claim 13, wherein, the determination of the centered image position comprises:
- calculating the white space by subtracting the image width from the width of the print head and dividing difference by two; and
- adding the white space to a left side of the image width.

20. The method according to claim 19, further comprising, sending the image and the centered image position to the print head.

* * * * *